No. 877,799. PATENTED JAN. 28, 1908.
C. E. RIDER.
PLANING SAW.
APPLICATION FILED OCT. 3, 1907.
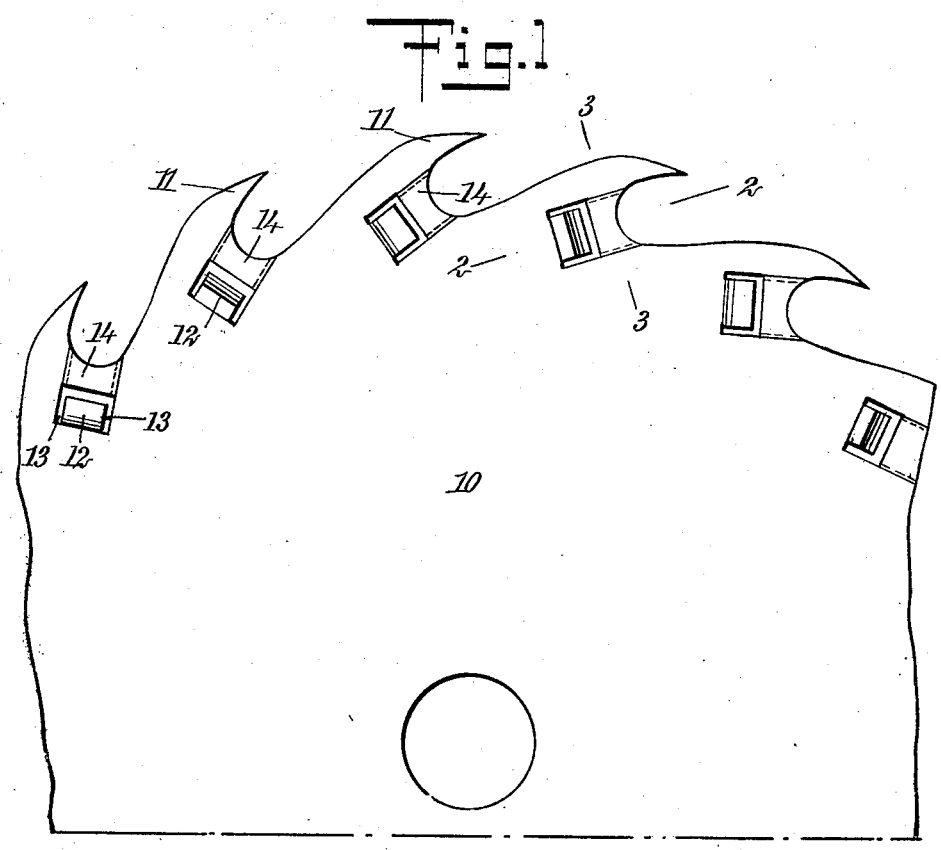
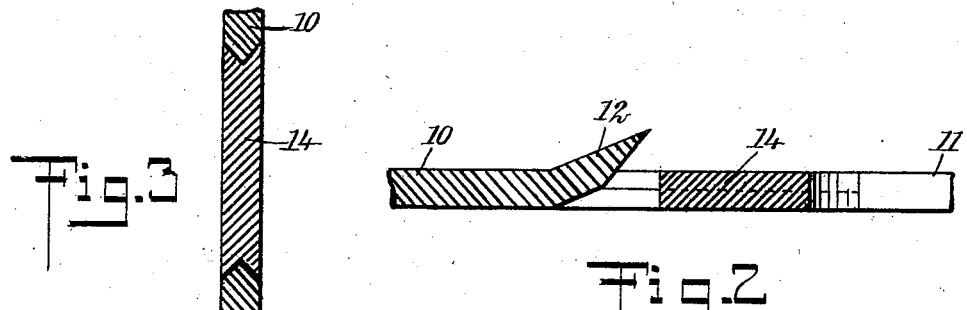
WITNESSES:
INVENTOR
Charles E. Rider
BY
ATTORNEYS

UNITED STATES PATENT OFFICE.

CHARLES EDWARD RIDER, OF MYRTLE POINT, OREGON.

PLANING-SAW.

No. 877,799.  Specification of Letters Patent.  Patented Jan. 28, 1908.

Application filed October 3, 1907. Serial No. 395,665.

*To all whom it may concern:*

Be it known that I, CHARLES EDWARD RIDER, a citizen of the United States, and a resident of Myrtle Point, in the county of Coos and State of Oregon, have invented new and useful Improvements in Planing-Saws, of which the following is a full, clear, and exact description.

This invention has reference to improvements in saws which operate to plane the wood at each side of the saw-cut as the sawing proceeds.

The object of the present invention is the provision of a saw of this nature of simple construction, which will make a smooth clean cut on both soft and hard woods, and which will expel the saw-dust as it is produced, whereby the planing-blades or bits will not be choked and thus cause the saw to heat and run hard.

Reference is to be had to the accompanying drawings, forming a part of this specification, in which similar characters of reference indicate corresponding parts in all the views.

Figure 1 is a fragmentary side elevation of a circular saw embodying my invention; Fig. 2 is a section of the same on an enlarged scale on the line 2—2 of Fig. 1; and Fig. 3 is a section on an enlarged scale on the line 3—3 of Fig. 1.

I preferably apply my improvement to a circular saw 10 having wellknown form of ripping-teeth 11. At the root of each tooth 11 in substantial alinement with the gaps between adjacent teeth are stamped from the body of the saw planing-blades or bits 12, the blades being alternately bent to opposite sides of the saw and beveled off on their inner faces to provide cutting edges, as best illustrated in Fig. 2, these cutting edges of the blades being arranged at substantially forty-five degrees to a radial line of the saw, whereby the cutting of the blades will take place gradually from the corners thereof.

At each side of each blade 12 slots 13 are formed which admit of the blades being easily set. In front of each blade 12 a block 14 is slidably and tightly fitted, which operates to eject the saw-dust as it is produced by the saw teeth and thus prevent the dust from wedging in between the planing-blades and wood, which would cause the saw to heat and run hard. These blocks 14, as best shown in Fig. 3, are formed with V-shaped grooves in their bottom and top edges, which closely fit counter-part guides formed on the saw. This prevents the blocks from being displaced from the body of the saw in a sidewise direction. The blocks 14 may be removed when desired in setting and sharpening the blades 12.

The invention as shown and described while being my preferred form of construction may nevertheless be modified, as will be apparent to those skilled in the art, within the scope of the appended claims.

Having thus described my invention, I claim as new and desire to secure by Letters Patent:

1. A circular saw having ripping-teeth, planing-blades at the root of the teeth in substantial alinement with the gaps between adjacent teeth, said teeth being spaced from the saw at opposite sides by slots, and alternately bent to opposite faces of the saw, and a removable block inserted at the front of each blade, separating said blade from the gap between the adjacent teeth for the purpose described.

2. A saw having teeth, and planing blades carried by the body of the saw at the root of the teeth and bent to the opposite sides of the saw, said blades having cutting edges facing the gaps between adjacent saw teeth, and separated from said gaps by intervening parts.

3. A saw having teeth, planing-blades stamped from the body of the saw at the root of the teeth and alternately bent to the opposite sides of the saw, said blades having cutting edges arranged at substantially forty-five degrees to a radial line of the saw, and blocks at the front of the blades, separating them from the gap between the adjacent saw teeth.

4. A saw having teeth, planing blades at the root of the teeth in substantial alinement with the gap between the teeth, and a removable block slidably inserted at the front of each tooth, separating it from the gap.

In testimony whereof I have signed my name to this specification in the presence of two subscribing witnesses.

CHARLES EDWARD RIDER.

Witnesses:
L. A. ROBERTS,
J. M. ARRINGTON.